Feb. 28, 1967 C. E. SLOOP 3,307,081
METER BOX ASSEMBLY WITH COVER SEAL AND INNER SEAL
Filed May 17, 1965 3 Sheets-Sheet 1
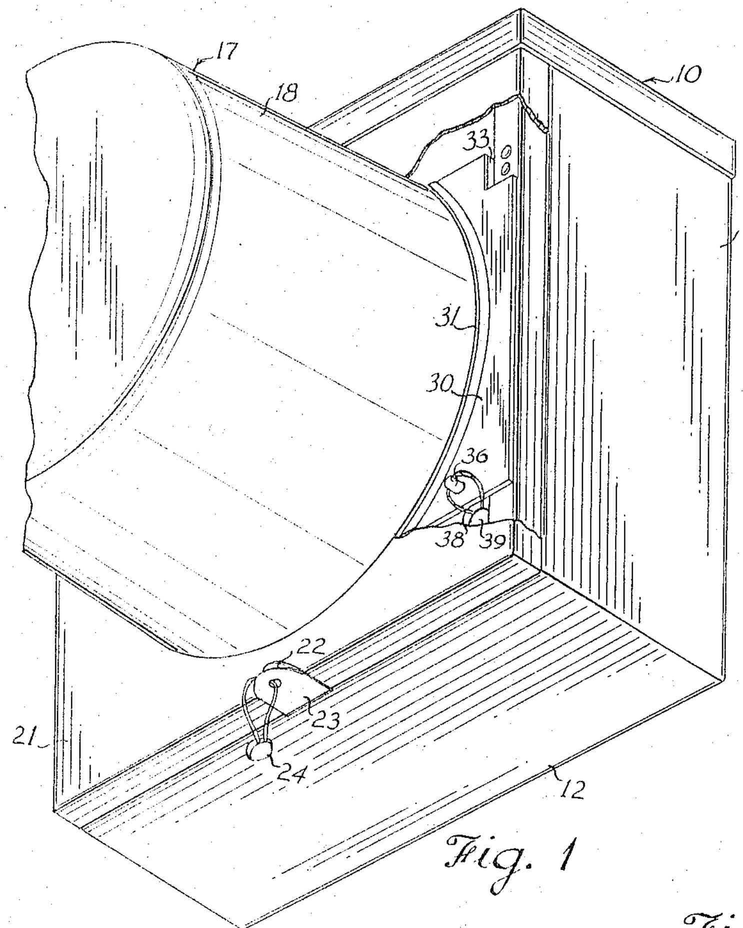
Fig. 1
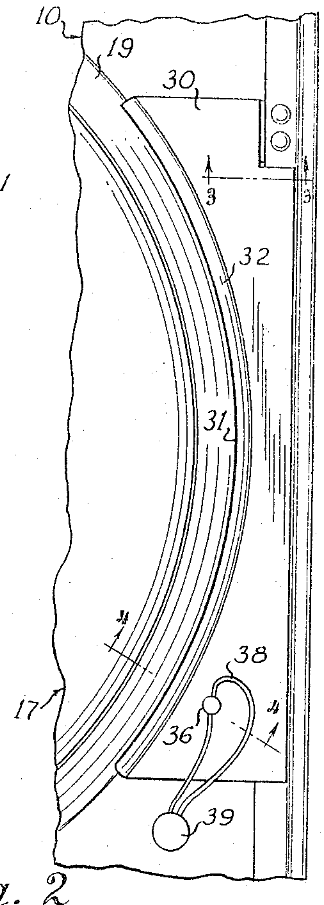
Fig. 2
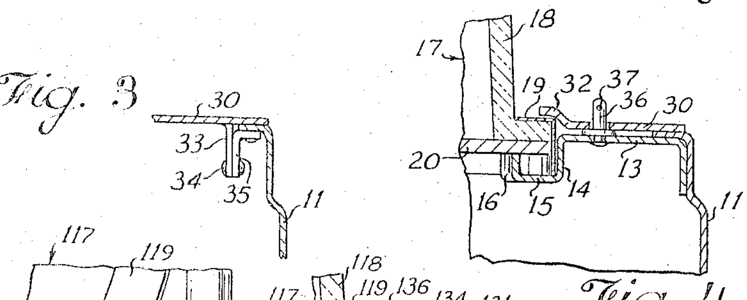
Fig. 3
Fig. 4
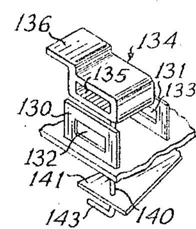
Fig. 7
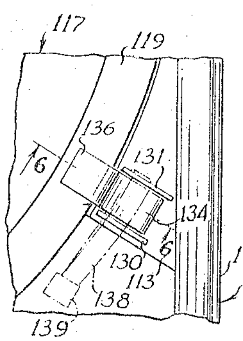
Fig. 5
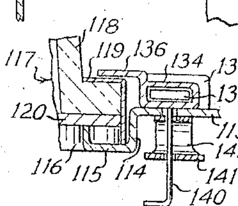
Fig. 6
INVENTOR.
CLIFFORD E. SLOOP
BY [signature]
ATTORNEY

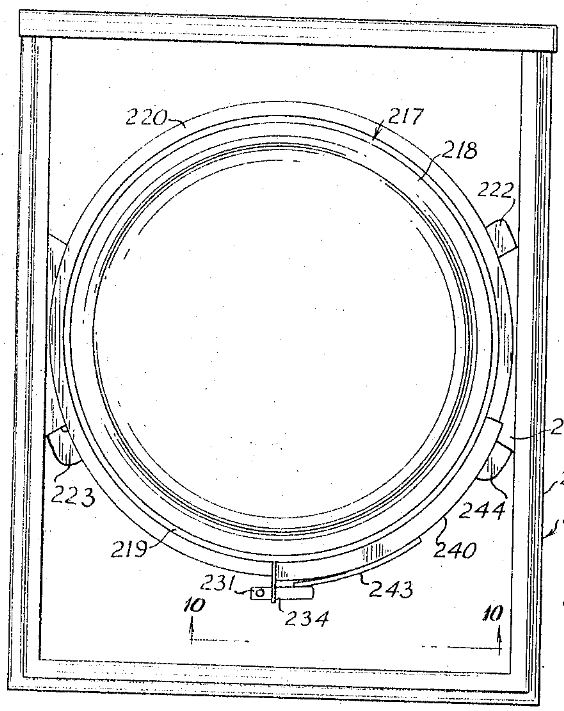
Fig. 8
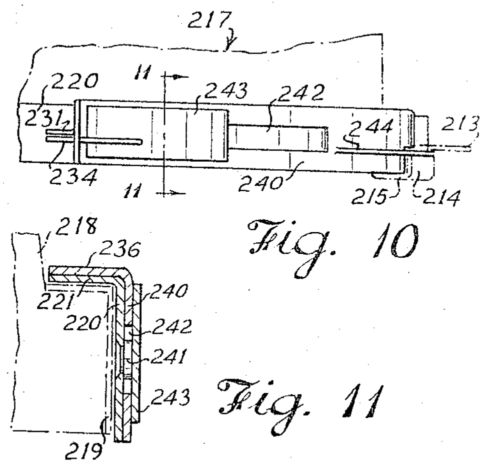
Fig. 10
Fig. 11
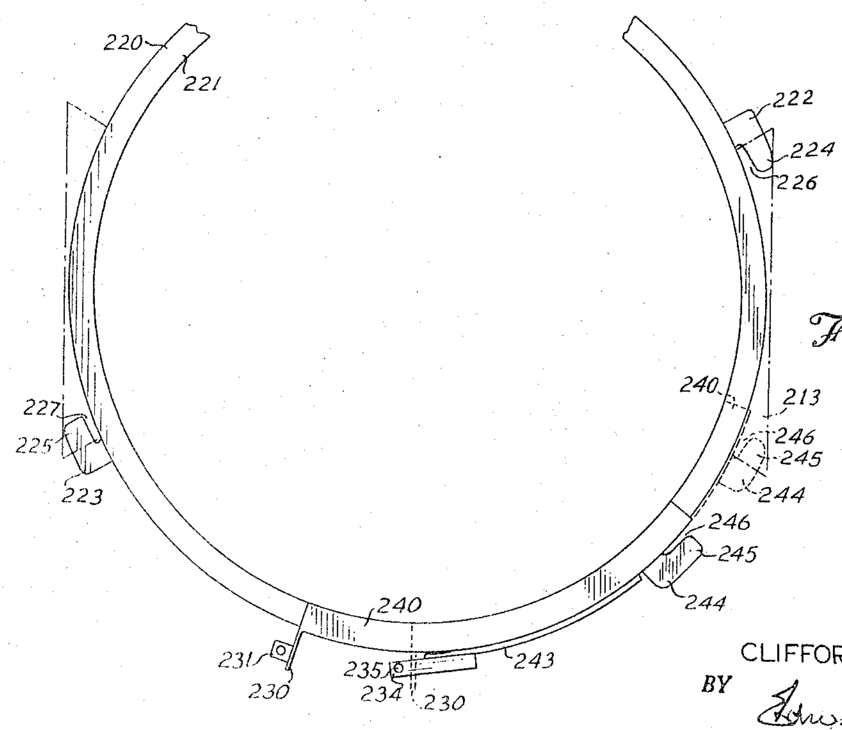
Fig. 9
INVENTOR.
CLIFFORD E. SLOOP
BY
ATTORNEY

METER BOX ASSEMBLY WITH COVER SEAL AND INNER SEAL

Filed May 17, 1965 3 Sheets-Sheet 3

INVENTOR
CLIFFORD E. SLOOP

Newton, Hopkins, Jones & Ormsby

ATTORNEYS

United States Patent Office 3,307,081
Patented Feb. 28, 1967

3,307,081
METER BOX ASSEMBLY WITH COVER SEAL AND INNER SEAL

Clifford E. Sloop, 2230 10th St., Columbus, Ga. 31906
Substituted for abandoned application Ser. No. 74,101, Dec. 6, 1960. This application May 17, 1965, Ser. No. 456,574
7 Claims. (Cl. 317—107)

This invention relates to electrical meter box assemblies, and is more particularly concerned with a sealing or locking device for an electrical meter.

In the marketing of electricity, substantially the only means employed for measuring the amount of electricity utilized by a particular customer is a watt-hour meter. The watt-hour meter is usually connected in the incoming line or to secondary coils of transformers in the incoming lines. In either event, a meter box is employed to support the meter, the meter box containing uninsulated terminals across which jumpers may be placed to shunt the incoming current around the meter. If jumpers are not employed, a mere one hundred-eighty degree rotation of the position of the meter will either cause the meter not to run at all or cause the meter to run backwards. It is therefore seen that some method of locking the meter box is imperative.

The utilities have great numbers of meter sockets for which an individual means of economical securement must be provided for each. This is generally accomplished with a seal on the outer surface of the socket. The seals are essentially of a fragile nature and are used to discourage unauthorized tampering.

The meter box of conventional construction is provided with a cover which retains the meter, there being a seal passing through the cover and the box so that the cover can not be removed without breaking the seal. The conventional construction, however, places the seal in such a position that it may be inadvertently torn off or broken; therefore, when such prior art seals are broken, there is no way to ascertain whether the breakings are purposeful or accidental.

With this problem in mind, I have devised, in combination with a meter box, can or socket of conventional construction, an inner seal in addition to the outer seal. Briefly, the inner seal of the present invention includes a movable lip on the box and is adapted to secure the lip in its overlapped position so that the meter can not be removed from the socket without breaking this inner seal. The inner seal, in turn, is protected from inadvertent breakage by the outer cover or cover plate of the box. Thus, while the usual exterior or outer seal may be broken, corroded, aged and damaged because of its exposed location, my inner seal assures that no tampering has taken place so long as the inner seal is unbroken. The inner seal of the present invention is enclosed within the box and, if broken, ipso facto, will indicate not only that the outer seal has at one time been broken, but also a tampering with the socket cover itself. This saves many man hours of labor for the utility companies since it indicates those places where the seals were broken with serious intent.

It is therefore among the objects of the present invention to provide a means for indicating if a meter box has been tampered with after the seal has been broken.

It is another object of the present invention to provide means other than the conventional outside seal for sealably trapping a meter in the socket.

Another object of the present invention is to provide means for locking a meter into the socket which means may be provided with a seal.

A further object of the present invention is to provide removable, sealable means which may be readily installed on a conventional meter socket.

A further object of the present invention is to provide a sealable lock for meter box assemblies, the lock being so designed as to be efficient, simple and economical to manufacture.

Other and further objects, features and advantages of the present invention will become apparent from consideration of the following specification taken in conjunction with the accompanying drawings in which:

FIG. 1 is a partially broken perspective view of a conventional meter box assembly having installed thereon one preferred embodiment of the present invention.

FIG. 2 is an enlarged fragmentary front elevational view of a detail of the device shown in FIG. 1.

FIG. 3 is a cross sectional view taken substantially on the line 3—3 of FIG. 2.

FIG. 4 is a cross sectional view taken substantially on the line 4—4 of FIG. 2.

FIG. 5 is an enlarged fragmentary side elevational view of a conventional meter box assembly having a modified form of the present invention installed thereon.

FIG. 6 is a cross sectional view taken substantially on the line 6—6 of FIG. 5.

FIG. 7 is a fragmentary perspective view of the device as shown in FIGS. 5 and 6.

FIG. 8 is a front elevational view of a conventional meter box assembly with the cover thereof removed and having another modification of the present invention installed thereon.

FIG. 9 is an enlarged fragmentary elevational view of the locking ring of the meter box assembly illustrated in FIG. 8, the ring being removed from the meter box.

FIG. 10 is a partial front view of the device shown in FIGS. 8 and 9.

FIG. 11 is a cross sectional view taken substantially on the line 11—11 of FIG. 10.

Figure 12:
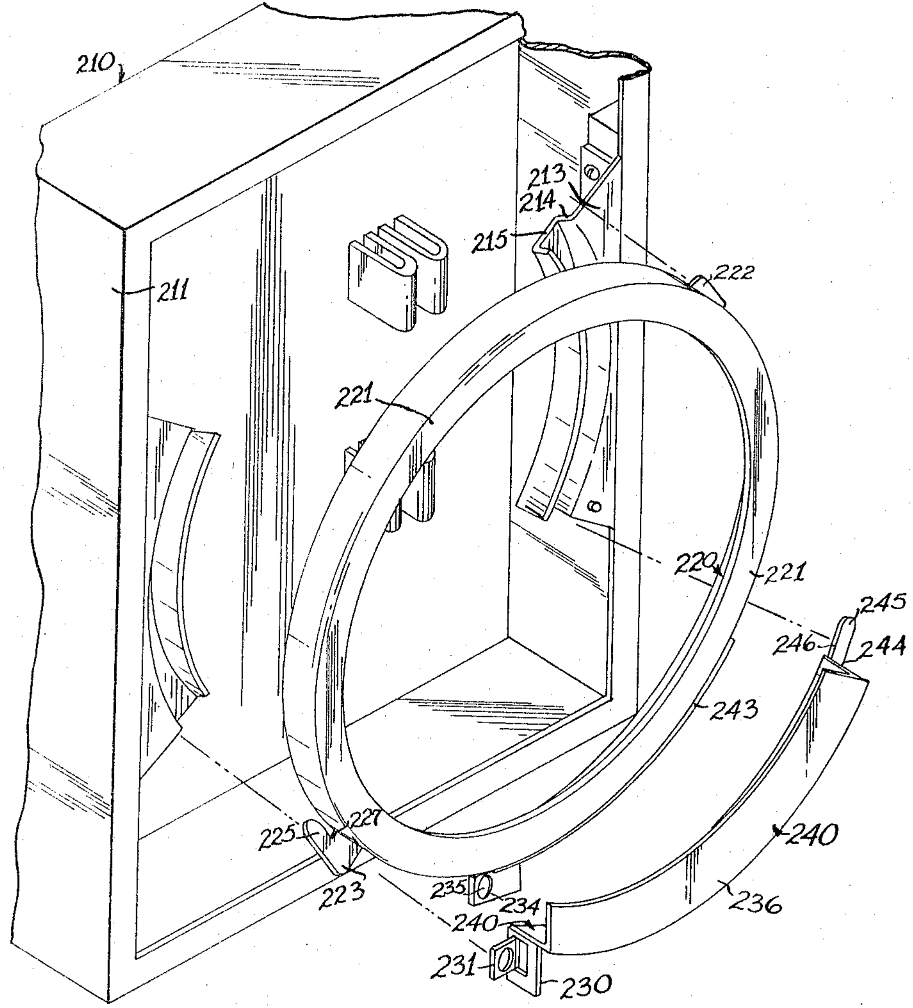
FIG. 12 is an exploded view of the ring embodiment illustrated in FIGS. 8–11.

Referring now in detail to the embodiments chosen for the purpose of illustrating the present invention, it being understood that in its broader aspects the present invention is not limited to the exact details herein depicted, numeral 10 denotes generally a rectangular meter box having side 11 and bottom 12 and containing the usual insulator blocks, terminals and contactor jaws (not shown). As is customary, the meter box 10 is provided with a pair of transversely opposed seating brackets 13 secured to the forward inner walls of the sides, such as side 11. Each bracket 13 is an integrally formed member having an L-shaped mounting base mounted on the side such as side 11 and extends transversely toward its opposed bracket, then inwardly toward the back of box 10 to provide a concaved wall 14 from the lower end of which protrudes, transversely, the abutment shoulder 15 which is offset from and parallel to the transversely extending portion of the bracket 13. Along the outer concaved edge of shoulder 15 is an upstanding arcuate flange 16.

The customary meter box assembly also includes a meter 17 having a glass case 18 and a sealing ring 19 at one end. The sealing ring 19 is of larger diameter than the cylindrical glass case 18 and retains a back plate 20. The back plate 20 usually carries the meter elements and is provided with rearwardly extending spades (not shown) which contact the contactor jaws within the box 10.

When properly installed, the ring 19 is carried essentially between the brackets and a front cover 21, the concaved walls 14 of the brackets preventing appreciable lateral movement of meter 17 and the shoulders 15 and flanges 16 preventing inward movement of the meter 17. The cover 21 usually has a lock or latch element 22 which registers with a lock or latch element 23 on box 10 so that a wire clasp or sealable lock 24 passed through at least one of the elements 22 and 23 prevents the cover 21 from being removed, without severing the lock 24.

The various locking means or inner locks to be described hereinafter are incorporated on the same type of meter box assembly as above described. Therefore, it is sufficient to point out that the second embodiment of FIGS. 5, 6 and 7 is incorporated on a box 100 having a side 111, a bracket 113 having an inner concaved wall 114, shoulder 115 and flange 116 against which rests the base 120 of the meter 117. The meter 117 has a ring 119 and case 118. The third embodiment of FIGS. 8, 9, 10 and 11 has a box 210 with a side 211, a bracket 213 having an inner concaved wall 214 and a shoulder 215 against which rests the ring 219 of meter 217. The meter has a case 218.

Referring now to the first embodiment of FIGS. 1–3, it will be seen that I have provided a hold-down plate 30 which fits between the cover 21 and one of the seating brackets. In other words, plate 30 is sandwiched between bracket 13 and cover 21 when the cover 21 is installed. The plate 30 is pivotally connected at one end to the side 11 and provided with a lock at the other end so that a portion of the plate 30 overhangs ring 19.

In more detail, the plate 30 is a flat, essentially rectangular, rigid member, the inner edge 31 of which is concaved or arcuate to conform to the curvature of the glass case 18 so as to overlie the ring 19. The portion adjacent edge 31 is deformed outwardly to provide an arcuate lip 32 spaced outwardly from plate 30 so that the lip passes around the upper edge of the periphery of ring 19 as shown in FIG. 4.

The upper outer corner of plate 30 is bent inwardly to provide a vertically disposed inwardly projecting tab 33 which, as best seen in FIG. 3, is pivotally secured by a transverse pivot pin 34 to a downwardly extending pivot plate 35 which protrudes from the forward edge of side 11. It is now seen that plate 30 is free to pivot outwardly in a vertical path about a horizontal or transverse axis formed by pivot pin 34 and that limited transverse movement of plate 30 is permitted by the flexibility of tab 33 and plate 35. Therefore, in order to permit installation of meter 17, it is necessary to pivot the plate 30 upwardly. After installation of the meter 17, the plate 30 is swung downwardly until it is parallel and in registry with bracket 13, as shown in FIG. 4. In such a position, only the pivoting upwardly and outwardly of plate 30 will free the meter 17 since the lip 32 overhangs ring 19.

For assuring that the plate 30 is retained in the "in registry" or "closed" position, an upstanding post 36 protrudes outwardly from the lower edge of bracket 13 so as to project through an appropriate opening in plate 30. A transverse hole 37 through post 36 provides an eyelet for the cable 38 of a seal 39. The hole through which the post 36 projects, when plate 30 is in registry with the bracket 13, is sufficiently small that the cable 38 and seal 39 will not pass therethrough. Thus, even with cover 21 removed, until seal 39 is broken and cable 38 removed, the plate 30 may not be pivoted upwardly so as to permit the removal of meter 17.

Referring now to the second embodiment as depicted in FIGS. 5–7, the secondary lock or lock means for preventing removal of the meter 117 includes a pivotable lip which also overlies the ring, such as ring 119. This lip is, as in the previous embodiment, secured to or adjacent the bracket 113 so as to be essentially in registry or parallel to the bracket 113 while at the same time overlying the ring 119.

In more detail, on the lower outer portion of bracket 113 there are provided a pair of spaced parallel, essentially radially extending guide bars 130 and 131 which protrude out from bracket 113. The guide bars 130, 131 are flat, rectangular members arranged essentially perpendicular to the bracket 113 and provided with a pair of aligned openings 132, 133. The openings 132 and 133 are non-circular, preferably rectangular, apertures.

For fitting somewhat snugly between the guide bars 130 and 131 is a member 134 of hollow rectangular cross-section which has a rectangular opening 135 corresponding to the openings 132 and 133. An upwardly and outwardly protruding lip 136 is provided on the inner edge of the member 134, the lip 136 projecting over and snugly engaging ring 119 when the openings 132, 133 and 135 are aligned. A lock, including a flexible strap or tongue 138 having a non-circular, e.g. rectangular, cross section, passes through the openings 132, 133 and 135 and fixes the lip 136 in its overlapping position. The ends of the strap 138 are joined by a seal 139. It is now seen that as long as strap 138 remains in place, the lip 136 will prevent the meter 117 from being removed.

For preventing inadvertent pivoting or tilting of the lip 136 and member 134 and also to prevent the member 134 and lip 136 from becoming lost or otherwise disconnected from the box 100, a rod 140 protrudes inwardly from the inner surface of member 134, through an appropriate aperture in bracket 113 and through an aperture in an alignment flange 141 spaced below bracket 113 by spacer 142. The spacer 142 is secured to the inner surface of bracket 113. The inner end of rod 140 is bent to provide a radially extending stop bar 143.

It will be observed that the rod 140 is closer to one of the guide bars 130 or 131 than to the other, i.e., it is asymmetrically located with respect to the guide bars 130, 131. Also, the rod 140 protrudes below flange 141 by a distance greater than the height of guide bars 130, 131. Therefore, the member 134 may be lifted by axial movement of rod 140 so as to clear the guide bars 130, 131 and then pivoted by rotation of rod 140 until the lip 136 clears rim or ring 119. Because of the asymmetrical position of rod 140, the member 134 can only fit between the guide bars 130, 131 when the lip 136 is overhanging the ring 119. Because of the thickness of member 134, the cover, such as cover 21 of the previous embodiment, cannot be installed over the box 100 unless the tubular member is in place between the guide bars 130, 131.

Figure 13:
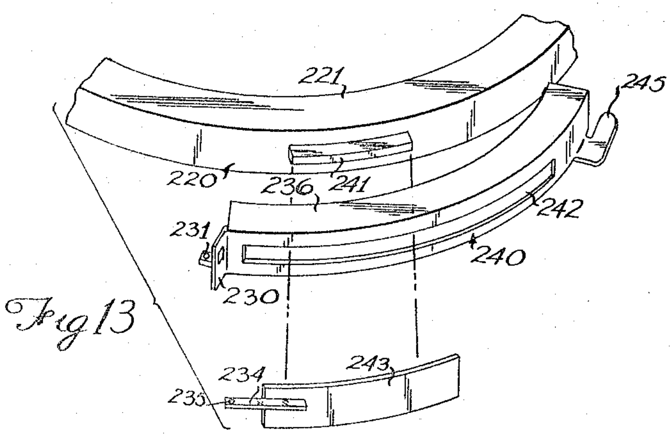
FIG. 13 is an exploded view of the lower portion of the ring embodiment illustrated in FIG. 12.

Referring now to the third embodiment as illustrated in FIGS. 8–13, the secondary lock or lock means includes a ring or annulus 220 with an inwardly turned lip 221 which overlaps the ring 219 of the meter 217. The opposed portions of the lower or inner edge of ring 220 are cut away to provide opposed recesses sufficiently long than these recesses will receive the side brackets, such as bracket 213, when the ring 220 is fitted over ring 219 and will permit limited rotation of the ring 220 with respect to ring 219 of the meter.

At the edges of the recesses, diametrically opposed, outwardly protruding flanges 222 and 223 are provided. The flanges 222 and 223 extend in a plane parallel to and inwardly of the plane of lip 221 and are provided with tangentially clockwise extending fingers 224 and 225 which are spaced from the outer edge of ring 220 so as to provide tangentially opening slots 226 and 227 therebetween. When the ring 220 is fitted over the ring 219 of the meter after the meter 217 is installed in the box or socket 210, the thickness of ring 219 is of such a size that the flanges 222, 223 and their fingers 224, 225 are in a plane below the plane of the transversely extending portions of the brackets 213 while being above the shoulders, such as shoulder 215. Thus, when the ring 220 is properly positioned and rotated in a clockwise direction, the fingers 224, 225 will protrude beneath the transversely extending portions of the brackets 213, while the slots 226, 227 receive the edges of the concaved walls such as wall 214 of the brackets. Thus, an "interrupted screw" type junction is provided.

For locking the ring 220 in its rotated position and thereby locking the ring 219 in its socket, the ring 220 is provided with a locking member 240 which is an arcuate ring segment slidable along the outer surface of ring 220. The locking member 240 is provided with a longitudinal central opening or slot 242 through which protrudes a guide flange 241, the guide flange 241 being secured to the ring 220. Outwardly of member 240, a keeper plate 243 of a larger size than slot 242 is secured to the outer edge of the guide flange 241 so as to overlie the member 240. The locking member 240 has an inwardly turned upper flange 236 which overlaps the lip 221 of ring 220.

At the most clockwise end of member 240 is an outwardly protruding axially disposed plate 230 provided with radially extending slot and a radially disposed guide bar 231 adjacent thereto and extending in a clockwise direction. Circumferentially aligned with the slot of plate 230 so as to protrude therethrough upon counterclockwise movement of member 240 is a flat member or finger 234 carried by the keeper plate 243. The arrangement is such that, upon counterclockwise movement of member 240 from the position shown by continuous lines in FIG. 9 to the position shown by broken lines therein, the plate 230 will be moved therewith so that finger 234 protrudes through the slot of plate 231 so as to lie in juxtaposition with the guide bar 231. Thus, the holes 232 and 235 on bar 231 and finger 234 respectively will come into alignment for receiving a cable, such as cable 38 in FIG. 2, to lock the member 240 in its counterclockwise rotated position.

At the most counterclockwise end of member 240 is an outwardly protruding flange 244 with a counterclockwise extending finger 245 defining between the finger 245 and the ring 220 a counterclockwise opening slot 246. The flange 244 and finger 245 are in the same plane with the flanges 222, 223 and fingers 224, 225, the flanges 222 and 244 being spaced apart by the length of the concaved wall 214 when the member 240 is in its counterclockwise rotated position. Therefore, with the finger 224 extending under the upper edge of the transversely extending portion of bracket 213, as seen in FIG. 8, the finger 245 will extend under the lower edge of the transversely extending portion of bracket 213. Hence, with a cable through the holes or openings 232 and 235, the meter 217 is prevented from being removed from its socket or box 210, as long as the cable remains in place.

With the cable removed, the member 240 may be rotated in a clockwise direction, thereby disengaging finger 245 from bracket 213 and enlarging the space between fingers 224 and 245. Thereafter, the ring 220 may be rotated in a counterclockwise direction sufficiently that the fingers 224 and 225 are removed from beneath the brackets 213. When this is done, the ring 220 is free from box 210 and meter 217 may be removed. Of course, with the ring 220 in its installed position, the cover such as cover 21 may be installed on the box 210 over the ring 220 and its outer lock or seal (not shown) installed.

In all embodiments, it is seen that the inner seal of the inner lock means is covered by cover such as cover 21 and is therefore essentially enclosed within the socket, access being had to the inner seal, only by the removal of the cover 21 and this only after the rupture of the outer lock or seal such as seal 24. Hence, until two seals are broken, the meter of the meter socket assembly cannot be removed.

It will be obvious to those skilled in the art that many variations may be made in the embodiments chosen for the purpose of illustrating the present invention without departing from the scope thereof as defined by the appended claims.

I claim:

1. In a meter socket of the type in which a meter with a sealing ring is received in jaws in a meter box with the sealing ring of the meter received on bracket means in the meter box and in which a cover extends over the sealing ring and is locked in place by a primary lock, the combination therewith of secondary locking means extending between said meter and said cover for prevening the disengagement of said meter from said jaws, said secondary locking means including a movable circumferential member surrounding said meter and having an inner lip overlying said sealing ring beneath said cover and means for securing said circumferential member in position surrounding said meter with said lip overlying said sealing ring, said secondary locking means being so positioned and arranged as to be inaccessible from the exterior of said meter socket except when said primary lock is unlocked and said cover is removed from its original position on said meter box.

2. The invention as claimed in claim 1 wherein said circumferential member is provided with outwardly disposed, circumferentially extending lugs removably engageable with said bracket means upon rotational movement of said circumferential member when said member is in position surrounding said meter.

3. In a meter socket of the type in which a meter with a sealing ring is received in jaws in a meter box with the sealing ring received on bracket means in the meter box and in which a cover extends over the sealing ring and is locked in place by a primary lock, the combination therewith of secondary locking means extending between said sealing ring and said cover for preventing the disengagement of said meter from said jaws, said secondary locking means including in combination at least one pair of spaced apart guide members extending outward from said bracket means, at least one retaining member adapted to be received between said guide members and having a lip portion which extends over said sealing ring of said meter when said retaining member is in position between said guide members, and removable means for securing said retaining member in position between said guide members, said secondary lock being so positioned and arranged as to be inaccessible from the exterior of said meter socket except when said primary lock is unlocked and said cover is removed from its original position on said meter box.

4. In a meter socket of the type having a meter box provided with jaws for receiving a meter, a removable cover for closing said box, and sealable means for retaining said cover in place, the combination therewith of a plate along one edge of said box and beneath said cover, said plate being pivotally connected to said meter box at one end of said plate and having an aperture in the other end thereof, a lip on one edge of said plate adapted to overlie a portion of the base of said meter in said box for preventing the removal of said meter from the jaws of the meter box, a post fixed with respect to said box, said post being in the arcuate path of said aperture in said plate so as to project through said aperture when said edge overlies said base.

5. In a meter socket of the type having a meter box with bracket means which receive the ring of a meter removably installed on the box and wherein a removable cover with a primary lock extends over the ring of the meter to secure the meter in place with respect to jaws in said box and for closing said box to prevent tampering therewith, the combination therewith of an outwardly protruding fixed member carried by said bracket means, a movable member movable toward and away from the surface of said bracket means so as to be in registry with said fixed member in one position of said movable member for preventing the disengagement of said meter from said jaws, there being provided a lip protruding from said movable member so as to extend over said ring in one position of said movable member, and secondary lock means installable on said fixed member for projecting outwardly of said fixed member and for preventing appreciable movement of said movable member from said one position when said secondary lock means is so projecting.

6. In a meter socket of the type having a meter box with bracket means which receive the ring of a meter removably installed for preventing the disengagement of said meter from jaws on the box and wherein a removable cover with a primary lock extends over the ring of the meter to secure the meter in place with respect to said box and for closing said box to prevent tampering therewith, the combination therewith of an outwardly protruding fixed member carried by said bracket means, a movable member movable toward and away from the surface of said bracket means so as to be in registry with said fixed member in one position of said movable member, there being provided a lip protruding from said movable member so as to extend over said ring in said one position of said movable member for preventing the disengagement of said meter from said jaws, secondary lock means installable on said fixed member for projecting outwardly of said fixed member and for preventing appreciable movement of said movable member from said one position when said lock means is so projecting, and guide means carried by said meter box and connected to said movable member for guiding said movable member from said one position to a position in which said lip is no longer projecting over said ring.

7. In a meter socket of the type having a meter box with bracket means which receive the ring of a meter removably installed for preventing the disengagement of said meter from jaws on the box and wherein a removable cover with a primary lock extends over the ring of the meter to secure the meter in place with respect to said box and for closing said box to prevent tampering therewith, the combination therewith of an outwardly protruding fixed member carried by said bracket means, a movable member movable toward and away from the surface of said bracket means so as to be in registry with said fixed member in one position of said movable member, there being provided a lip protruding from said movable member so as to extend over said ring in said one position of said movable member for preventing the disengagement of said meter from said jaws, secondary lock means installable on said fixed member for projecting outwardly of said fixed member and for preventing appreciable movement of said movable member from said one position when said secondary lock means is so projecting, and guide means carried by said meter box and connected to said movable member for guiding said movable member from said one position to a position in which said lip is no longer projecting over said ring, said fixed member extending toward said cover, said cover overlying said movable member, said lip and said fixed member when said movable member is in said one position and when said cover is extending over said ring.

References Cited by the Examiner

UNITED STATES PATENTS

| | | | |
|---|---|---|---|
| 1,269,770 | 6/1918 | Wurdock | 317—105 |
| 2,113,744 | 4/1938 | Pixley et al. | 317—105 X |
| 3,183,408 | 5/1965 | Keller et al. | 317—107 X |

ROBERT K. SCHAEFER, *Primary Examiner.*

W. C. GARVERT, *Assistant Examiner.*